(12) United States Patent
Klinner

(10) Patent No.: US 7,690,657 B2
(45) Date of Patent: Apr. 6, 2010

(54) FLAT GASKET

(76) Inventor: Manfred Klinner, Evrystr. 46a, 53844 Troisdorf (DE)

( * ) Notice: Subject to any disclaimer, the term of this patent is extended or adjusted under 35 U.S.C. 154(b) by 271 days.

(21) Appl. No.: 10/545,885

(22) PCT Filed: Dec. 12, 2003

(86) PCT No.: PCT/DE03/04106

§ 371 (c)(1),
(2), (4) Date: Jun. 6, 2006

(87) PCT Pub. No.: WO2004/072516

PCT Pub. Date: Aug. 26, 2004

(65) Prior Publication Data

US 2006/0290071 A1 Dec. 28, 2006

(30) Foreign Application Priority Data

Feb. 15, 2003 (DE) .................................. 103 06 416

(51) Int. Cl.
*F02F 11/00* (2006.01)
(52) U.S. Cl. ...................................... 277/591; 277/598
(58) Field of Classification Search .......... 277/591–598
See application file for complete search history.

(56) References Cited

U.S. PATENT DOCUMENTS

| 4,728,110 | A | | 3/1988 | Nakasone | |
| 4,834,399 | A | * | 5/1989 | Udagawa et al. | 277/592 |
| 5,297,807 | A | * | 3/1994 | Udagawa | 277/595 |
| 5,395,128 | A | * | 3/1995 | Udagawa | 277/595 |
| 5,451,063 | A | * | 9/1995 | Udagawa et al. | 277/595 |
| 5,628,518 | A | * | 5/1997 | Ushio et al. | 277/593 |
| 5,669,615 | A | * | 9/1997 | Hohe et al. | 277/595 |
| 6,250,645 | B1 | * | 6/2001 | Udagawa | 277/595 |
| 6,688,606 | B2 | * | 2/2004 | Hohe et al. | 277/600 |
| 6,779,800 | B2 | * | 8/2004 | Udagawa | 277/592 |
| 7,311,309 | B2 | * | 12/2007 | Udagawa et al. | 277/592 |

FOREIGN PATENT DOCUMENTS

| DE | 19512650 | 4/1997 |
| DE | 29712005 | 10/1997 |
| EP | 0508045 | 4/1991 |
| EP | 0407090 | 9/1991 |
| GB | 2273136 | 4/1992 |

* cited by examiner

*Primary Examiner*—Vishal Patel
(74) *Attorney, Agent, or Firm*—Robert L. Stearns; Dickinson Wright, PLLC

(57) ABSTRACT

A gasket for installation between components, that under operating conditions are subjected to temperature-dependent relative motions, in particular a cylinder head gasket for an internal combustion engine, built from multiple individual seal packets, of which a least one is assigned to each component and that at least under operating conditions a gliding relative motion is given solely between contact surfaces of the individual seal packets.

4 Claims, 2 Drawing Sheets

Figure 1:
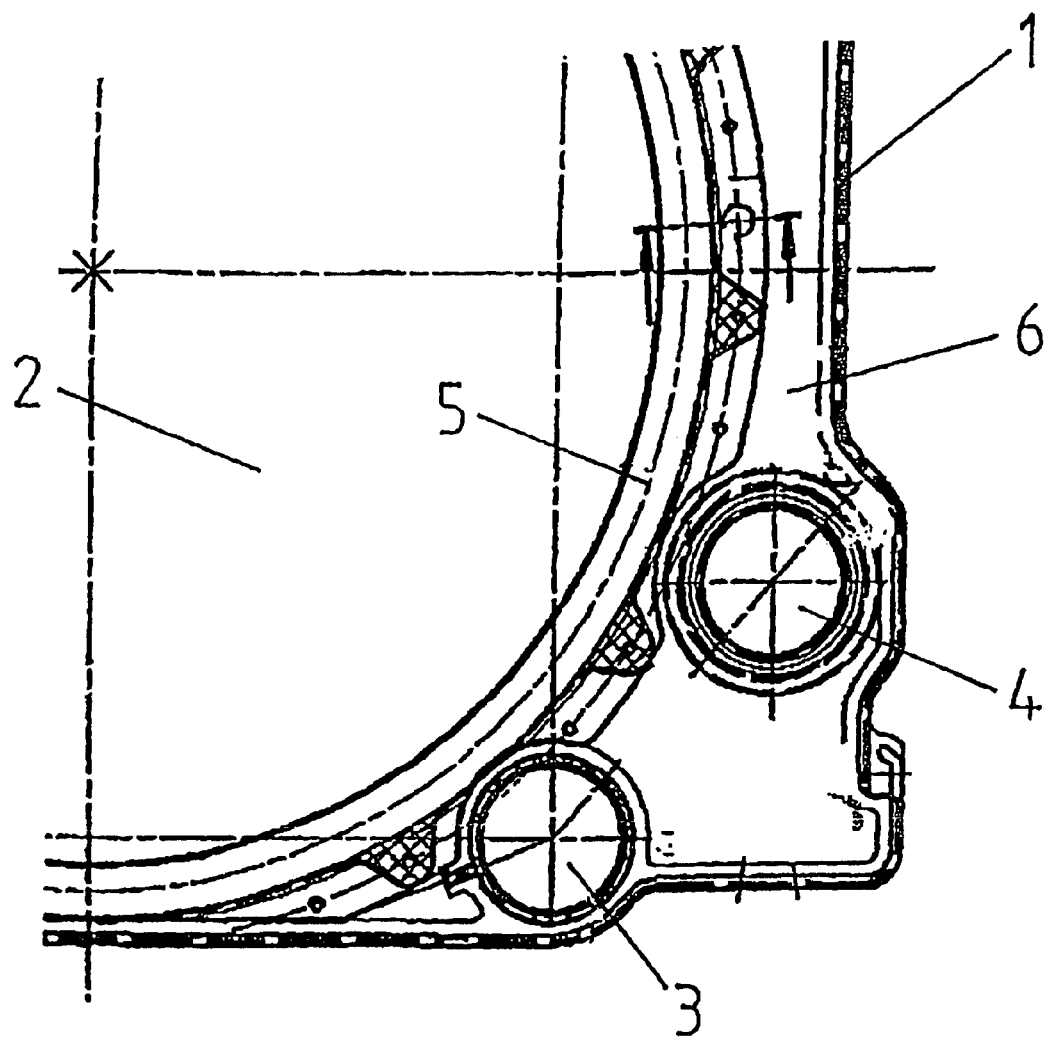

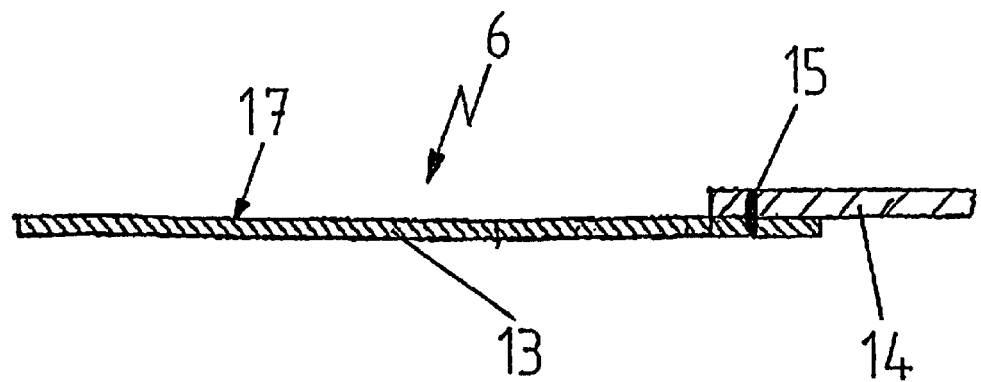
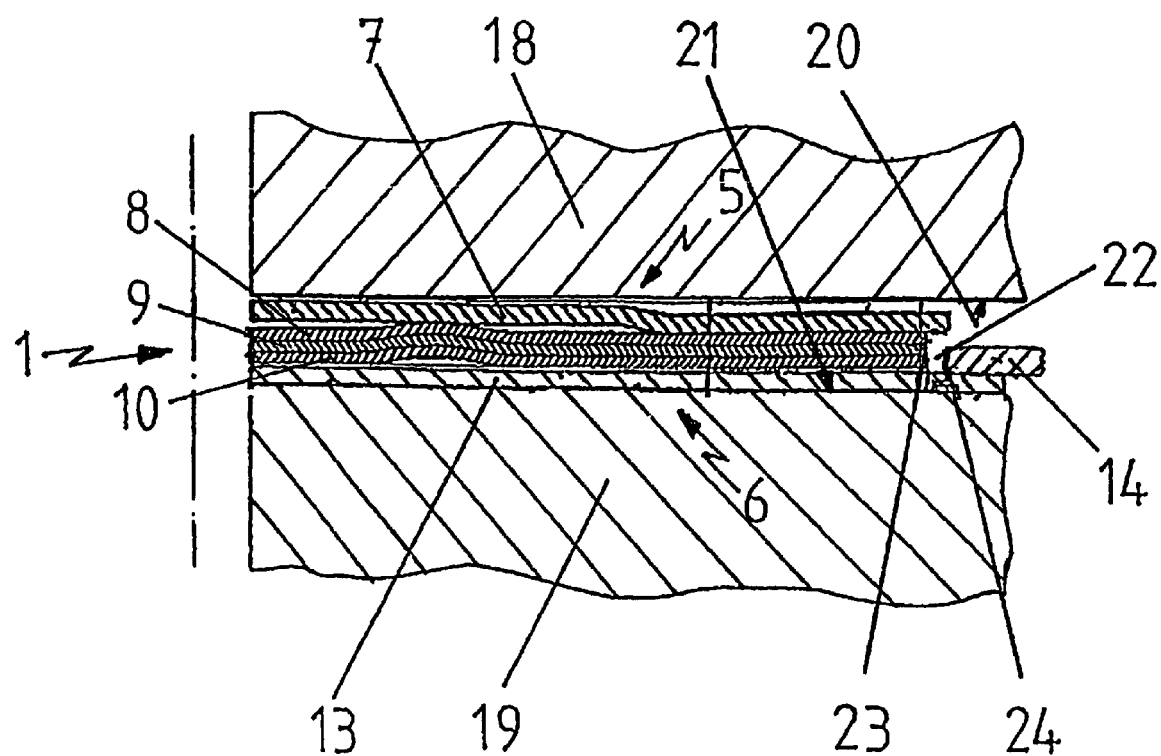

FLAT GASKET

BACKGROUND OF THE INVENTION

1. Technical Field

This invention relates to a gasket for installation between components that under operating conditions are subjected to temperature dependent relative motions, in particular a cylinder head gasket for an internal combustion engine.

2. Related Art

To seal against media, for example in combustion chamber seals of internal combustion engines, sealing elements are required between the surfaces to be sealed. These elements are usually formed with gaskets, such as cylinder head gaskets. Current internal combustion engines are, in many cases, manufactured from a motor block consisting of cast material and a cylinder head consisting of light metal. Due to different thermal expansions of the named materials, a slide motion occurs between the motor block and the cylinder head, where these motions are absorbed by the cylinder head gaskets, which up to now, are normally constructed as multi-layer but one-piece. As a consequence of the different operating temperatures to which internal combustion engines are subjected, these slide motions turn out to a greater or lesser extent, whereby an increased frictional wear, due to the relative motion of the motor block relative to the cylinder head, or vice versa, occurs on the surfaces to be sealed, that can lead to leakage.

It was attempted to bring about an improved glide motion of the surfaces to be sealed over the seal through the coating of the surfaces. In practice however, this was not successful.

In German patent DE-C 195 12 650, a cylinder head gasket for an internal combustion engine has been disclosed that has a multi-layer assembly, in which in particular, on the combustion-chamber side wire rings are arranged between the individual layers, so that the affected layers carry out a type of roll motion and the relative motion between the motor block and the cylinder head, consequently is shifted into the area of the seal. The design assembly of this cylinder head gasket in this case is regarded as complex. As a result of the pressing at the assembly, the wire ring is pressed into the surrounding sealing material, whereby a roll motion of the layers is hampered in the case of the relative motion of the surrounding components.

SUMMARY OF THE INVENTION AND ADVANTAGES

An object underlying the invention is to make available a gasket, in particular a cylinder head gasket, that in comparison to the prior art has a simplified assembly and that makes possible a decoupled relative motion of the affected components within the seal. This objective is achieved by a gasket for installation between components, that under operating conditions are subject to temperature-dependent relative motions, in particular a cylinder head gasket for an internal combustion engine, composed of multiple individual seal packets, of which at least one is assigned to each component and that at least under operating conditions a gliding relative motion is given solely between contact surfaces of the individual seal packets. With the use of at least two separate seal packets as gaskets, in particular cylinder head gaskets, a relative motion within the seal is made possible. In comparison to the prior art a simpler construction is assured, as no insertion of a separate wire body, that enables a roll motion, is required. The slide motion of the affected components, in particular the relative motion between the cylinder head and the motor block is consequently displaced into the seal in form of said glide motion.

The individual seal packets may, but do not necessarily initially, for assembly reasons, have to be bound with each other. This can be brought about, for example through, under operating conditions detachable or a flexible connection of the individual seal packets to each other, for example by an adhesive or a sealing compound. In any case however, it must be assured that under the operating conditions a relative motion of the individual seal packets to each other is possible. The seal effect is brought about, as usual, from the contact of the gasket to the individual surfaces to be sealed. As a consequence of the improved surface quality within the gasket, in comparison to the machined rough surface of the surfaces to be sealed of the affected components such as the cylinder head and the motor block, the adhesion inside of the gasket is lower, because between the surfaces to be sealed and the gasket, as a rule, a clamp effect is achieved.

With the subject of the invention, a multiplicity of technical possibilities relating to the assembly of gaskets, in particular of cylinder head gaskets become possible. The gasket can in general be inserted everywhere where components of different materials are employed that are exposed to high temperatures and that require an appropriate seal.

If the individual seal packets are comprised of several sheet metal bodies, these can be joined to one another, in particular by means of welding. However, alternative joining possibilities, such as riveting, gluing, or similar, are also conceivable.

As with conventional gaskets, in particular cylinder head gaskets, the possibility of beading areas is envisioned. As this is not relevant to the present invention, it will not be covered further here.

THE DRAWINGS

The basic structure of the gasket according to the present invention is represented in the drawings and is described in the following. These show:

FIG. 1 partial view of a cylinder head gasket

Figure 2:
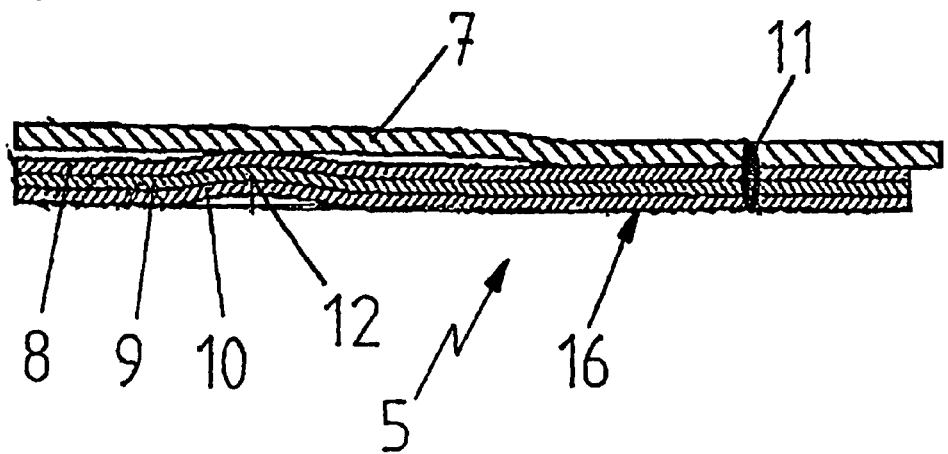

FIGS. 2 and 3 illustration of individual seal packets for building the cylinder head gasket according to FIG. 1

FIG. 4 schematic diagram of a possible embodiment between a motor block and a cylinder head

DETAILED DESCRIPTION

FIG. 1 shows as a schematic diagram a detail of cylinder head gasket 1 containing combustion chamber side aperture 2 as well as media pass-through openings 3 and 4. The reference numbers 5 and 6 show in principle that the cylinder head gasket 1 is composed of several individual seal packets that are described in more detail in the following figures.

The FIGS. 2 and 3 show the individual seal packets 5 and 6. The seal packet 5 is composed of a first metal layer 7 that builds a base plate and which is turned towards the first component that will not be represented here further.

With the base plate 7, further metal layers 8, 9 and 10, are joined by a weld join 11. In well-known methods the metal layers 8 thru 10 are equipped with bead areas 12. The second seal packet 6 is built with a metal base plate 13, which is turned towards the second component. The base plate 13 works together with another metal element 14 and will be securely joined with it by a weld join 15. The individual seal packets 5 and 6 are placed in each other, not connected to each other, and are positioned facing the components. For the purpose of transport or for storage, the individual seal packets 5 and 6 may be, for example, flexibly connected to each other. The high temperature of the operating condition breaks down this elastic connection so that a gliding relative motion of the individual seal packets 5 and 6 against each other is possible. The individual seal packets 5 and 6 feature contact planes 16 and 17 turned towards one another, between which the gliding relative motion can take place.

FIG. 4 shows a possible embodiment of the cylinder head gasket 1. The reference number 18 shall represent a cylinder head consisting of light metal and the reference number 19 shall represent a motor block consisting of cast iron. Observable is that the seal packet 5 with regard to the base plate 7 is turned towards the seal surface 20 of the cylinder head 18, whereas the seal packet 6, respective to the base plate 13 is assigned to the seal surface 21 of the motor block 19. The seal packets 5 and 6 lie in each other such that a clearance 22 is formed that defines a slide path of the individual seal packets 5 and 6 against each other.

Stated in the prior art according to DE-C 195 12 650, the slide path can amount to up to 0.7 mm, so that the clearance 22 is laid out in the appropriate way with a tolerance such that the edges 23 and 24 lying opposite each other, on the sides of the metal layers 8, 9 and 10, and on the other side of metal element 14 can not come in contact with each other.

I claim:

1. A gasket for installation between components to be sealed, comprising:

a first seal packet having at least two metal gasket layers that are stacked on one another and inseparably fixed to one another against relative sliding movement;

at least a second seal packet having at least two other metal gasket layers that are stacked on one another and inseparably fixed to one another against relative sliding movement: and wherein said seal packets are stacked together and are slidable relative to one another, said seal packets are installable separate from one another in between the components positioned in centered form, with each seal packet having an opening substantially aligned with a cylinder bore formed in at least one of the components, said seal packets are detachably attached with each other in a manner that enable them to detach, under operating conditions, and said seal packets are detachably attached by a partial elastic adhesion between the seal packets.

2. The gasket of claim 1 wherein metal gasket layers of the respective seal packets are inseparably fixed by a weld.

3. A gasket according to claim 1 wherein the metal gasket layers of each seal packet are fixed to each other by a weld joint across abutting planar surfaces.

4. A gasket according to the claim 1, wherein the seal packets have boundary edges spaced from one another to enable the seal packets to seal with their respective component and to slide relative to one another with sliding movement of the components in operation without the edges contacting one another.

* * * * *